(12) United States Patent
Diament

(10) Patent No.: US 7,693,824 B1
(45) Date of Patent: Apr. 6, 2010

(54) NUMBER-RANGE SEARCH SYSTEM AND METHOD

(75) Inventor: Benjamin Jay Diament, Berkeley, CA (US)

(73) Assignee: Google Inc., Mountain View, CA (US)

( * ) Notice: Subject to any disclaimer, the term of this patent is extended or adjusted under 35 U.S.C. 154(b) by 711 days.

(21) Appl. No.: 10/690,401

(22) Filed: Oct. 20, 2003

(51) Int. Cl.
*G06F 17/30* (2006.01)

(52) U.S. Cl. ............. 707/3; 707/5; 707/10; 707/6

(58) Field of Classification Search .......... 707/3–5, 707/10, 100, 102
See application file for complete search history.

(56) References Cited

U.S. PATENT DOCUMENTS

| | | | |
|---|---|---|---|
| 4,774,657 A | | 9/1988 | Anderson et al. |
| 5,915,251 A | * | 6/1999 | Burrows et al. ............. 707/102 |
| 6,021,409 A | * | 2/2000 | Burrows ..................... 707/102 |
| 6,421,664 B1 | | 7/2002 | Groeschel et al. |
| 6,439,783 B1 | * | 8/2002 | Antoshenkov ................ 707/3 |
| 6,553,364 B1 | * | 4/2003 | Wu .............................. 707/1 |
| 6,571,233 B2 | * | 5/2003 | Beavin et al. ................. 707/2 |
| 6,826,566 B2 | * | 11/2004 | Lewak et al. ................. 707/4 |
| 7,007,019 B2 | * | 2/2006 | Kanno .......................... 707/5 |
| 7,020,782 B2 | * | 3/2006 | Rajasekaran et al. ........ 726/22 |
| 7,047,242 B1 | * | 5/2006 | Ponte .......................... 707/10 |
| 2003/0225779 A1 | * | 12/2003 | Matsuda .................... 707/102 |
| 2004/0243569 A1 | * | 12/2004 | Burrows ....................... 707/3 |

OTHER PUBLICATIONS

Introduction to Languages, Machines and Logic, Alan P. Parkes, 2002, pp. 1-36.*

* cited by examiner

*Primary Examiner*—Cam Y T Truong
(74) *Attorney, Agent, or Firm*—Morgan, Lewis & Bockius LLP

(57) ABSTRACT

A system and method is disclosed for generating numerical index terms for numbers encountered in documents indexed by a search engine. The numerical index terms include information about the indexed number (e.g., fieldname, characteristic, sign) and each digit, or a subset of the digits, of the number (e.g., position, value). Also, disclosed is a system and method of processing number-range search queries having one or more number ranges and generating expressions (e.g., Boolean expression tree) of numerical index terms based on a boundary number associated with the number range. An expression is used to control the search of a document index so as to identify documents that contain numbers that satisfy the expression.

27 Claims, 9 Drawing Sheets

Numerical Index Term 300

| fieldname | digit position | digit value | end flag | neg value flag | neg characteristic flag | other Info |
|---|---|---|---|---|---|---|
| | | | | | | |

```
                    Boolean Expression Tree 406
------------------------------------------------------------- Level 1
AND:
|----numrange_character_2
|----numrange_digit_0_7
|----numrange_digit_1_2
------------------------------------------------------------- Level 2
|----OR:
        |---numrange_digit_2_1
        |---numrange_digit_2_1_end
        |---numrange_digit_2_2
        |---numrange_digit_2_2_end
        |---numrange_digit_2_3
        |---numrange_digit_2_3_end
        |---numrange_digit_2_4
        |---numrange_digit_2_4_end
        |---numrange_digit_2_5
        |---numrange_digit_2_5_end
        |---numrange_digit_2_6
        |---numrange_digit_2_6_end
        |---numrange_digit_2_7_end
------------------------------------------------------------- Level 3
    |---AND:
            |---numrange_digit_2_7
------------------------------------------------------------- Level 4
        |---OR:
                |---numrange_digit_3_0
                |---numrange_digit_3_1_end
```

Figure 5

```
AND:
   |---<fieldname>_characteristic_2
   '---OR:
         |---AND:
         |     |---<fieldname>_digit_0_1
         |     '---OR:
         |           |---AND:
         |           |     |---<fieldname>_digit_1_8
         |           |     '---OR:
         |           |           |---<fieldname>_digit_2_9
         |           |           '---<fieldname>_digit_2_9_end
         |           |---<fieldname>_digit_1_9
         |           '---<fieldname>_digit_1_9_end
         |---<fieldname>_digit_0_2
         |---<fieldname>_digit_0_2_end
         |---<fieldname>_digit_0_3
         |---<fieldname>_digit_0_3_end
         |---<fieldname>_digit_0_4_end
         '---AND:
               |---<fieldname>_digit_0_4
               |---<fieldname>_digit_1_0
               '---OR:
                     |---<fieldname>_digit_2_0
                     |---<fieldname>_digit_2_1
                     |---<fieldname>_digit_2_1_end
                     |---<fieldname>_digit_2_2
                     |---<fieldname>_digit_2_2_end
                     |---<fieldname>_digit_2_3
                     |---<fieldname>_digit_2_3_end
                     |---<fieldname>_digit_2_4
                     |---<fieldname>_digit_2_4_end
                     '---<fieldname>_digit_2_5_end
```

Figure 6

```
OR:
|---AND:
|   |---<fieldname>_characteristic_2
|   '---OR:
|       |---AND:
|       |   |---<fieldname>_digit_0_1
|       |   |---OR:
|       |       |---<fieldname>_digit_1_5
|       |       |---<fieldname>_digit_1_5_end
|       |       |---<fieldname>_digit_1_6
|       |       |---<fieldname>_digit_1_6_end
|       |       |---<fieldname>_digit_1_7
|       |       |---<fieldname>_digit_1_7_end
|       |       |---<fieldname>_digit_1_8
|       |       |---<fieldname>_digit_1_8_end
|       |       |---<fieldname>_digit_1_9
|       |       '---<fieldname>_digit_1_9_end
|       |---<fieldname>_digit_0_2
|       |---<fieldname>_digit_0_2_end
|       |---<fieldname>_digit_0_3
|       |---<fieldname>_digit_0_3_end
|            ...
|       |---<fieldname>_digit_0_8
|       |---<fieldname>_digit_0_8_end
|       |---<fieldname>_digit_0_9
|       '---<fieldname>_digit_0_9_end
|---<fieldname>_characteristic_3   |---<fieldname>_characteristic_3_end
|---<fieldname>_characteristic_4   |---<fieldname>_characteristic_4_end
|---<fieldname>_characteristic_5   |---<fieldname>_characteristic_5_end
     ...
|---<fieldname>_characteristic_78  |---<fieldname>_characteristic_78_end
|---<fieldname>_characteristic_79  |---<fieldname>_characteristic_79_end
'---<fieldname>_characteristic_80_end
```

Figure 7

NUMBER-RANGE SEARCH SYSTEM AND METHOD

TECHNICAL FIELD

The present invention relates to the field of search engines, and in particular to systems and methods for number-range searching.

BACKGROUND

Search engine sites are extremely popular on the World Wide Web (WWW), as they allow users to quickly sift through billions of documents on the Internet. Many search engines search the WWW and/or newsgroups for one or more terms, keep an index of the terms they find and where they find them, and allow users to look for terms found in the index. A term is any word or group of words, such as a phrase or a combination of one or more words or phrases, that is treated as a unit when searching for documents containing the term.

There are two important phases of search engine operation: indexing and querying. Indexing is the preprocessing of documents in such a way as to make high-quality querying efficient in terms of time and cost. Indexing generally includes recording the position of each term in the documents in a manner that enables efficient retrieval during querying. Querying is the specification by a search engine user of a set of requirements to be met by a candidate document, and the presentation to the user of some set of documents that, according to some quality criteria, best match the user's specification.

A type of querying that is particularly helpful to search engine users is number-range searching. While conventional search engines allow a user to find a particular number, these search engines generally do not allow a user to search for a range of numbers, where an occurrence of any number in the range is of interest to the user. Some exemplary number-range searches include but are not limited to: product information (e.g., televisions at least 30 inches; 80 to 120 watt bulbs, etc.); historical information (e.g., wars between 1800 and 1900); age-related information (e.g., games for children 8 to 12 years old); pricing information (e.g., digital cameras between $200 and $500); health information (e.g., body weight over 190 lbs.); particular real numbers (e.g., any number between 3.14 and 3.15 to find the value of pi); outlier numbers (e.g., price-to-earnings ratio of over 100); lists (e.g., top 3-10 lists); resumes (e.g., grade point average of over 3.8); and nearby businesses (e.g., anything in the 2000-2300 block of Main Street, U.S.A.).

Accordingly, what is needed is a system and method of searching number ranges that allows a user to search for a range of numbers, where an occurrence of any number in the range is of interest to the user. Such a system and method should minimize the use of index space and accommodate a large range of numbers with high search resolution (where high resolution means having the ability to distinguish numbers that are close in value to one another).

SUMMARY

The present invention overcomes the deficiencies of conventional systems and methods by providing a system and method for generating numerical index terms for numbers encountered in documents indexed by a search engine. The numerical index terms include information about the number (e.g., fieldname, characteristic, sign) and each digit (or a subset of the digits) of the number (e.g., position, value). The present invention also includes a system and method of processing number-range search queries having one or more number ranges and generating expressions (for example, a Boolean expression tree) of numerical index terms based on one or two boundary numbers associated with the number range. An expression can be used to identify indexed documents in an index that contain numbers that satisfy the expression.

An embodiment of the present invention is a method of querying number-range searches. A number-range search query having one or more number ranges is used to generate an expression of one or more numerical index terms based on at least one boundary of the number range. The numerical index term includes information associated with an indexed number. One or more indexed documents containing numbers that satisfy the expression are identified.

An embodiment of the present invention is a method of indexing number ranges. One or more documents containing one or more numbers are used to generate a plurality of numerical index terms for each number. The numerical index terms include information associated with the number. Information corresponding to the numerical index terms is stored in an index for subsequent searches.

An embodiment of the present invention is a search engine for querying number-range searches. The search engine comprises a query encoder, which is configured to receive a search query for a number range having at least one boundary number. The query encoder is configured to generate an expression of one or more numerical index terms based on the boundary number. At least one numerical index term includes information associated with an indexed number. The search engine also includes an index server for identifying one or more indexed documents containing numbers that satisfy the expression.

An embodiment of the present invention is a search engine for indexing number ranges. The search engine comprises an indexer for receiving one or more documents containing one or more numbers. The indexer is configured to generate a plurality of numerical index terms for each number. The numerical index terms include information associated with the number. An document index coupled to the indexer is configured to store the numerical index term for subsequent searches.

Each numerical index term can include information indicative of a plurality of aspects of an indexed number, such as two or more aspects selected from the group consisting of the characteristic of the indexed number, the sign of the indexed number, the number type (e.g., generic number, integer, currency, or date) of the indexed number, and the position and value of at least one digit of the indexed number, and whether a particular digit is the last digit (sometimes call the end digit) of the indexed number.

BRIEF DESCRIPTION OF THE DRAWINGS

FIG. 5 is a diagram of a Boolean expression tree for a bounded number search query for the number range shown in FIG. 4, in accordance with one embodiment of the present invention.

FIG. 6 is a diagram of a Boolean expression tree for a bounded number search query, in accordance with one embodiment of the present invention.

FIG. 7 is a diagram of a Boolean expression tree for an unbounded number search query, in accordance with one embodiment of the present invention.

DESCRIPTION OF EMBODIMENTS

Search Engine Overview

Figure 1:
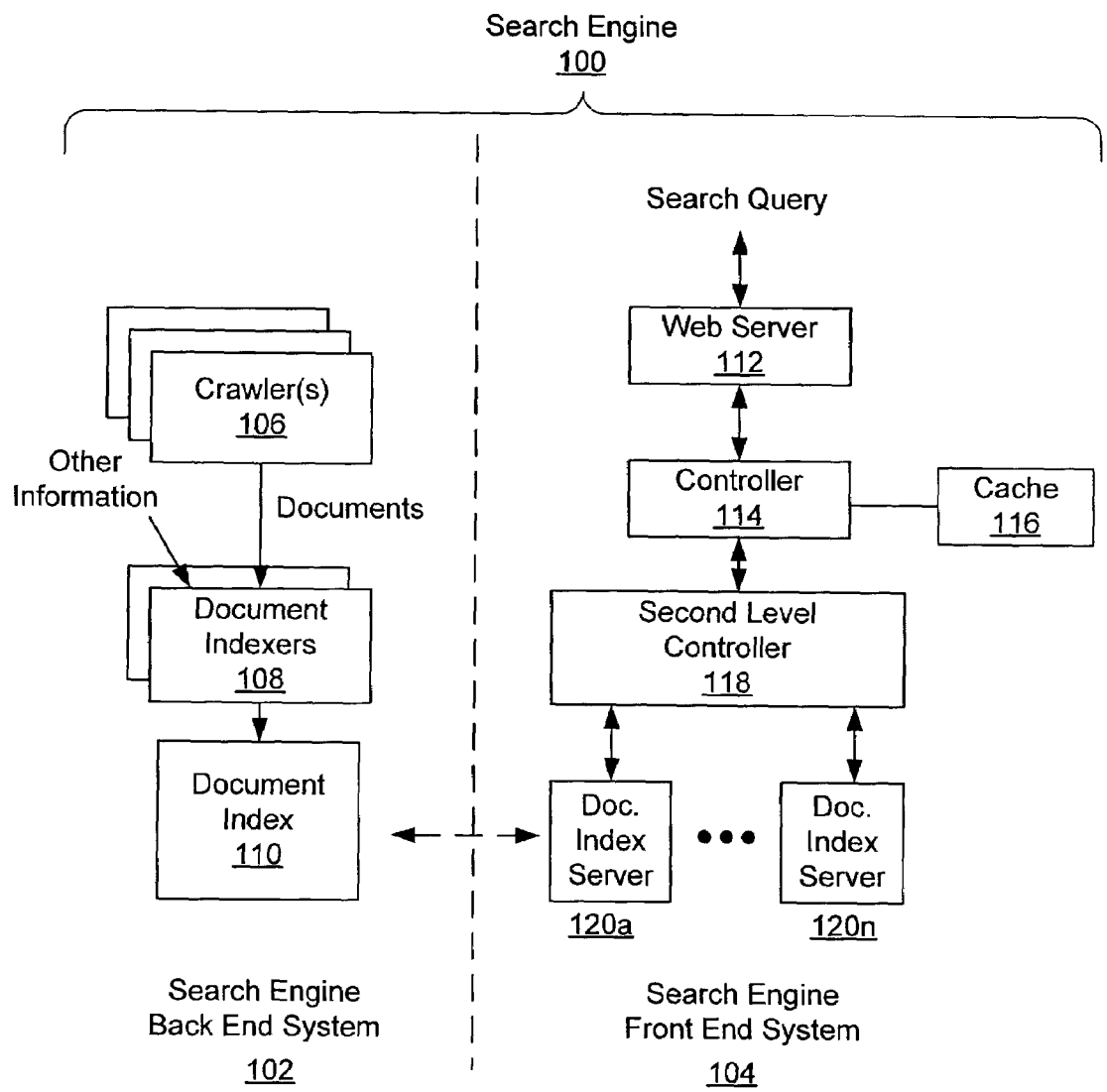
FIG. 1 is a block diagram of a search engine having a back end system and a front end system, in accordance with one embodiment of the present invention.

FIG. 1 is a block diagram of a search engine 100 having a back end system 102 and a front end system 104, in accordance with one embodiment of the present invention. The layout of the search engine system 100 is merely exemplary and may take on any other suitable layout or configuration.

The back end system 102 generally includes one or more crawlers 106 (also known as spiders), one or more document indexers 108 and a document index 110. To index the large number of Web pages that exist on the WWW, the web crawler 106 locates and downloads web pages and other information (hereinafter also referred to as "documents"). The document indexers 108 process the downloaded documents, creating the document index 110 of terms found in those documents. If a document changes, then the document index 110 is updated with new information. Until a document is indexed, it is generally not available to users of the search engine 100.

The front end system 104 generally includes a web server 112, a controller 114, a cache 116, a second level controller 118 and one or more document index servers 120a, ..., 120n. The document index 110 created by the search engine 100 is used to identify documents that contain one or more terms in a search query. To search for documents on a particular subject, a user enters or otherwise specifies a search query, which includes one or more terms and operators (e.g., Boolean operators, positional operators, parentheses, etc.), and submits the search query to the search engine 100 via the web server 112.

The controller 114 is coupled to the web server 112 and the cache 116. The cache 116 is used to speed up searches by temporarily storing previously located search results. In some embodiments the cache 116 includes both high speed memory and disk storage for storing cache search results. In some embodiments, the cache 116 is distributed over multiple cache servers. Furthermore, in some embodiments, the data (search results) in the cache 116 is replicated in a parallel set of cache servers. Providing more than one copy of the cache data provides both fault tolerance and improved throughput for quickly retrieving documents retrieved and stored during a previous search in response to the search query.

The controller 114 is coupled to the second level controller 118 which communicates with one or more document index servers 120a, ..., 120n. The document index servers 120a, ..., 120n encode the query into an expression that is used to search the document index 110 to identify documents that contain the terms specified by the search query. In some embodiments the document index servers 120 search respective partitions of the document index 110 generated by the back end system 102 and return their results to the second level controller 118. The second level controller 118 combines the search results received from the document index servers, removes duplicate results (if any), and forwards those results to the controller 114. In some embodiments there are multiple second level controllers 118 that operate in parallel to search different partitions of the document index, each second level controller 118 having a respective set of document index servers 120 to search respective sub-partitions of the document index. In such embodiments the controller 114 distributes the search query to the multiple second level controller 118 and combines search results received from the second level controllers 118. The controller 114 also stores the query and search results in the cache 116, and passes the search results to the web server 112. A list of documents that satisfy the query is presented to the user via the web server 112.

Indexing Operations

Figures 2, 3:
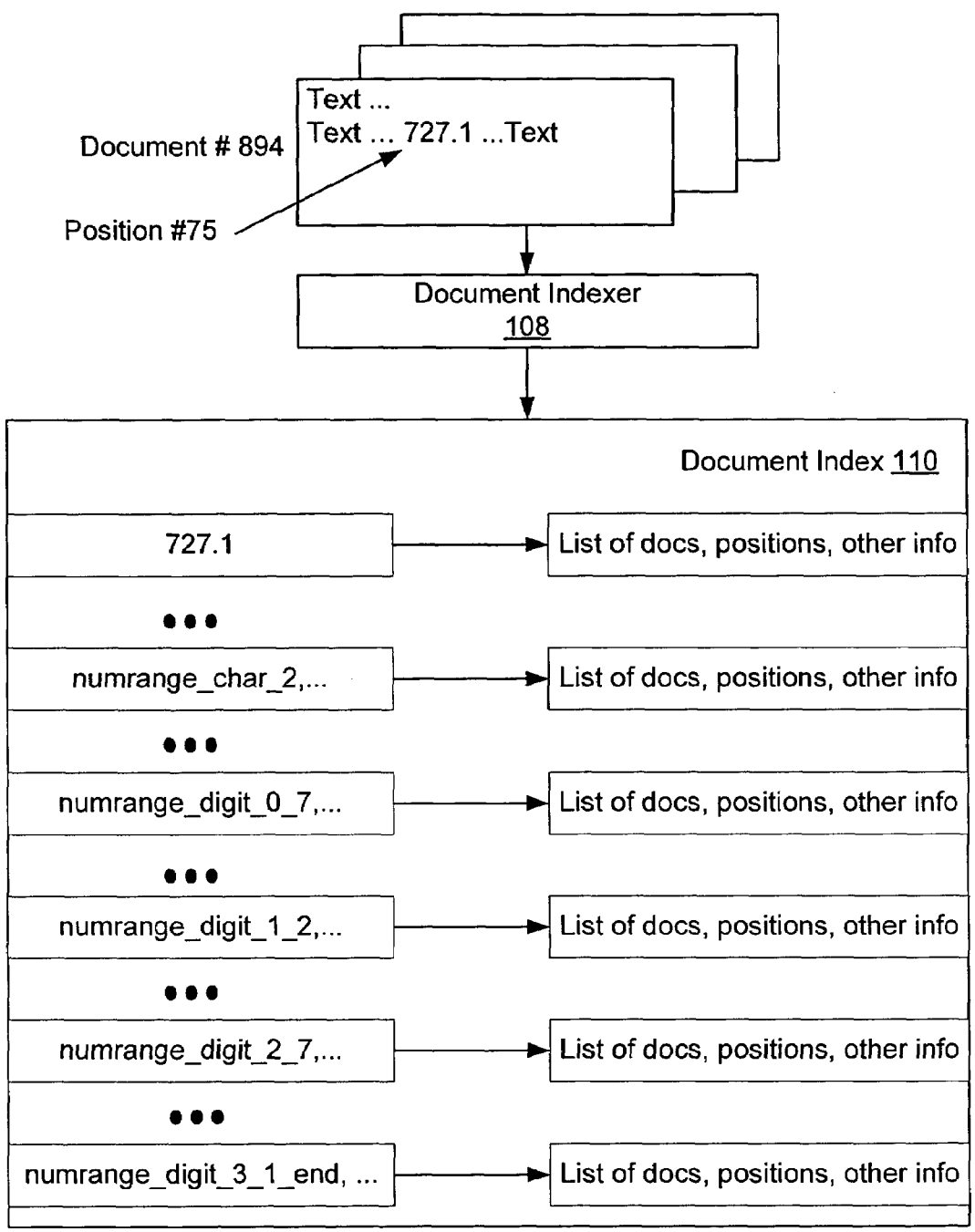
FIG. 2 is a diagram illustrating indexing operations, in accordance with one embodiment of the present invention.
FIG. 3 is a diagram illustrating the structure of a numerical index term, in accordance with one embodiment of the present invention.

FIG. 2 is a diagram illustrating indexing operations, in accordance with one embodiment of the present invention. During indexing operations, each number that is encountered in a document is recorded as being at some position in that document. For example, the number 727.1 might appear at position 75 in document number 894, and that information is recorded by the document indexer 108 in the document index 110. Additional information about the number 727.1 is also recorded in the document index 110 as a numerical index term. This information includes but is not limited to the characteristic of the number and its digits, which are meaningful for a fixed number base (e.g., 10, 100 or any other suitable base) in which indexing is performed. The "characteristic" of a number is defined as the integral part of the logarithm of the number taken in the fixed base. The "digits" are the quotients of the number divided by successive powers of the base. In the example above the number 727.1 (base 10) has characteristic 2 and digits 7, 2, 7, 1. Alternatively, the digits of the mantissa (fractional part of the logarithm) can be used.

In some embodiments, numbers to be indexed are preprocessed by a preprocessing function. For instance, a number to be indexed may be preprocessed so as to render it into one of a number of predefined canonical forms or to otherwise prepare the number for indexing. Examples of preprocessing functions include: scaling the number, linearly or nonlinearly, to improve resolution; reducing numbers larger than a predefined maximum number to a predefined upper cap value; increasing very small numbers (e.g., with large negative characteristic values) that are smaller than a predefined minimum number to a predefined lower cap value (e.g., $10^{-80}$), or by setting the characteristic of such numbers to the smallest characteristic value supported by the search engine. Other types of number preprocessing may be used in other embodiments.

Descriptive information relating to the indexed number is recorded by the document indexer 108 in the document index 110. Using the number 727.1 as an example, the information recorded by the indexer 108 in one embodiment includes:

727.1 occurs at position 75 in document 894.

A number with characteristic 2 occurs at position 75 in document 894.

A number with a first digit 7 occurs at position 75 in document 894.

A number with a second digit 2 occurs at position 75 in document 894.

A number with a third digit 7 occurs at position 75 in document 894.

A number with a fourth (and last) digit 1 occurs at position 75 in document 894.

The first index entry listed above uses the entire number as the term, as found in a conventional document index. The other index entries in the above example each has a term (i.e., the part of the entry that describes one or more aspects of the number) designed to facilitate number range searching.

To leverage the ability of the document indexer 108 to record numerical index terms at document positions, the above information can be abbreviated using a naming scheme. For example, the information described above can be represented in the index by a set of terms, each corresponding to an identified position in a document as follows:

| Term | Doc ID, Position |
|---|---|
| 727.1 | 894, 75 |
| numrange_characteristic_2 | 894, 75 |
| numrange_digit_0_7 | 894, 75 |
| numrange_digit_1_2 | 894, 75 |
| numrange_digit_2_7 | 894, 75 |
| numrange_digit_3_1_end | 894, 75 |

The above naming scheme provides a computer compatible representation of information, suitable for efficient encoding and use by a search engine. In other embodiments, other naming schemes can be used to provide an abbreviated form of the number related information for recording in the document index 110. A naming scheme may include conventions for negative numbers and/or for numbers with a negative characteristic. For example, the number −0.0063 is negative and has characteristic −3, so one possible numerical index term can be negative_numrange_characteristic_negative_3.

It is noted that the above naming scheme can be used, without modification, to represent the numbers in a document that use scientific notation. For example, the number $1.56 \times 10^{-2}$ would be represented in the index by the following terms (i.e., the portions of the index entries that describe one or more aspects of the number):

0.0156
numrange_characteristic_2_neg
numrange_digit_0_1
numrange_digit_1_5
numrange_digit_2_6_end.

In the above example, the "neg" portion of the "numrange_characteristic" entry indicates that the characteristic is a negative number. Alternately, to accommodate extremely large numbers (e.g., greater than 1080) and very small numbers (e.g., smaller than $10^{-80}$) having a very large characteristic, many of which will be represented in documents using scientific notation, the above naming scheme can be expanded to enable encoding of the characteristic using a characteristic and a set of digits when the number to be encoded is unusually large or small (i.e., greater in magnitude than a first threshold value or smaller in magnitude than a second threshold value). This can best be explained by example. In this alternate naming scheme, the number $678 \times 10^{3456}$ would be represented in the index by the following index terms:

numrange_characteristic_characteristic_3
numrange_characteristic_digit_0_3
numrange_characteristic_digit_1_4
numrange_characteristic_digit_2_5
numrange_characteristic_digit_3_6_end.
numrange_digit_0_6
numrange_digit_1_7
numrange_digit_2_8_end where the first five terms shown above represent the characteristic of the number and the last three entries represent the digits of the number. In addition, the $678 \times 10^{3456}$ number may be represented by a conventional index term, which may have the form "678x10e3456" where the symbol "e" indicates that the value following the symbol is an exponent, or any equivalent form suitable for use in a document index.

In the above example, the last digit (represented by the term "numrange_digit_2_8_end") was specially marked with an "end" marker to indicate during querying that the number indexed has no digits beyond that point. Note that the maximum number of digits recorded in the index 110 can be limited to save space in the index 110. In some embodiments, the maximum number of digits recorded in the index 110, for any number found in a document, is a predefined number between 5 and 20. In one embodiment, the maximum number of digits recorded in the index 110 for any number found in a document is six. Alternatively, the maximum number of digits can be increased to improve the search resolution.

Still referring to FIG. 2, it is noted that the document index 110 includes, for each distinct term, a list of tuples, each identifying a document and a position within the document. Since the index 100 includes entries for a large number of documents, many or most entries in the index will list multiple (document, position) tuples. Thus, for example, if multiple documents indexed by the document indexer 108 have numbers starting with the number 7, and/or there are multiple numbers starting with the number 7 in a document, the index 110 will include multiple (document, position) tuples for the term numrange_digit_0_7 so as to identify each occurrence of such numbers in the indexed documents.

FIG. 3 is a diagram illustrating the data structure of a numerical index term 300, in accordance with one embodiment of the present invention. The numerical index term 300 includes a fieldname, digit position, digit value, end flag, neg value flag, a neg characteristic flag, and optionally, any other information descriptive of the number to be indexed. The fieldname is used to specify the number type of the number. In the above examples, fieldname is "numrange" to indicate a generic number. Other fieldnames (e.g., "daterange" or "pricerange") can be used to describe other types of numbers, such as dates, prices, integers and the like. Only numbers that are recognized by the search engine's document indexer 108 as being of a specific, predefined type are indexed in that way; all other numbers are indexed as generic numbers. The digit position indicates the position of a digit in the indexed number and the digit value is the numerical value of that digit. Thus, the first digit in the number 727.1 has a digit value of 7 and is in digit position 0, the second digit in the number 727.1 has a digit value of 2 and is in digit position 1, and so forth. The end flag, when present or set in a numerical index term, indicates that the digit is the last digit in the indexed number and the neg value flag indicates that the indexed number is negative. The neg characteristic flag indicates that the characteristic of the indexed number is negative (e.g., the number 0.1 has a negative characteristic equal to −1, but is a positive number). Other information can be added to the numerical index term 300 as desired, such as a "10×10 flag" or any other suitable naming convention to indicate that the indexed number is written in scientific notation. In some embodiments, when a number in a document is exactly equal to zero, it is indexed by the document indexer 108 (FIG. 2) using a term having a special fieldname (e.g., numrange_zero) because the number zero does not have a characteristic and therefore requires special encoding. In other embodiments, occurrences of the number zero are indexed through the use of a "zero value" flag in the "other information" field of the numerical index term 300. In yet other embodiments, a number range type of index entry is not made for occurrences of the number zero, and instead a normalized index entry for the term "0" is used.

Querying Operations

Figure 4:
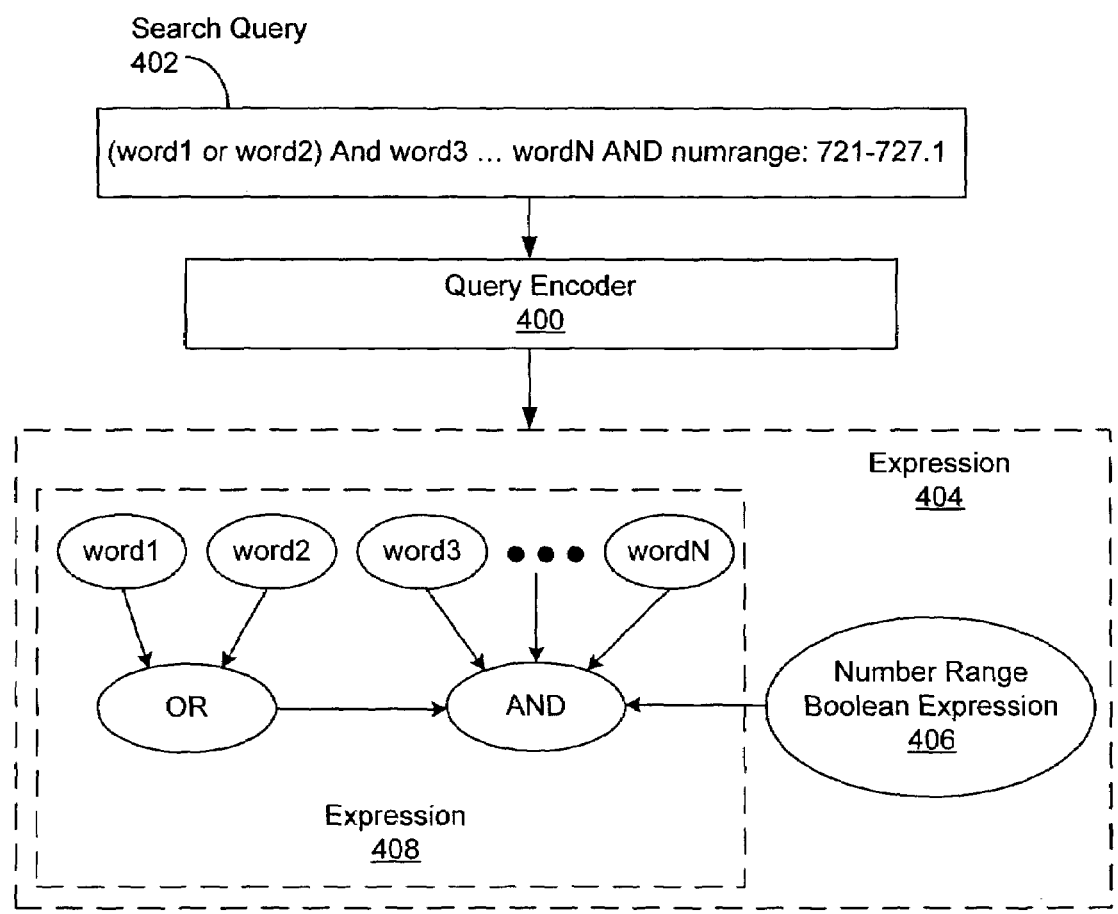
FIG. 4 is a diagram illustrating querying operations, in accordance with one embodiment of the present invention.

FIG. 4 is a diagram illustrating querying operations, in accordance with one embodiment of the present invention. During querying operations, a user specifies a search query 402 that includes one or more number range terms. Each number range term includes a range of numbers and may be considered to be a number range query. A query encoder converts the search query 402 into an expression 404 that is suitable for processing by a document index server 102. The expression 404 produced by the query encoder can be represented either conceptually or in terms of data structures as an expression tree. All expression trees referred to in this document can be encoded or represented as Boolean expressions, and in some embodiments are not encoded using a tree structure. For instance, in some embodiments, a Boolean expression may be represented as a nested expression, which is logically equivalent to the expression trees described below. In some embodiments a Boolean expression may be represented in other forms suitable for processing by a search engine or document index server 102.

The expression 404, represented in FIG. 4 as an expression tree, includes Boolean operator nodes (e.g., AND, OR) and leaf nodes. Each leaf node of the expression tree represents either term in the search query, or a term derived from a number range term in the search query. For each leaf node, a document index server of the search engine will perform an index lookup operation, so as to identify documents corresponding to the term represented by that node. The expression 404 (whether stored as an expression tree or otherwise) instructs the document index server 102 how to combine search results corresponding to each of the leaf nodes so as to produce a query result (also known as a search result).

In the example shown in FIG. 4, the expression 404 produced by the query encoder includes a number range Boolean expression 406, corresponding to a number range term in the search query, and another expression 408 corresponding to other terms in the search query. Depending on the particular search query submitted to the query encoder 400, the structure of the expression 404 may be more or less complex than the one shown in FIG. 4. Generally, the number of number range Boolean expressions (sometimes herein called number range Boolean expression trees) in expression 404 produced by the query encoder 400 will correspond to the number of number range terms in the search query being processed. Since the generation of expression trees (or more generally, expressions) for terms and combinations of terms other than number range terms is well known, only the aspects of the query encoder 400 that generate number range Boolean expressions trees will be discussed in detail in this document.

The query encoder 400 converts the number range x through y, where x and y are hereinafter referred to as boundary numbers, into a number range expression, which in some embodiments is a Boolean expression tree 406 including conjunctions (i.e., AND operations) and disjunctions (i.e., OR operations) of numerical index terms, which terms were previously described with respect to FIGS. 2 and 3. A variety of query syntaxes can be used to specify bounded and unbounded number ranges in a search query, and to thereby trigger number range searching by a search engine. Some examples of bounded search query syntax include "numrange: 10-100" and "10:100", both of which represent the range of 10 to 100. Some examples of unbounded search query syntax include "numrange: 10-?" and ">10", both of which represent the range starting at 10 and including all numbers larger than 10. In some embodiments, the specified number range includes the endpoint or endpoints of the specified range. Further, some embodiments may support making a distinction between "strict" and "non-strict" boundaries, according to the search engine user's specification. If a boundary is strict, then the boundary number is not included by the search engine in the search results (i.e., an occurrence of the boundary number in a document does not satisfy the specified number range). If a boundary is not strict, then the boundary number is included by the search engine in the search results (i.e., an occurrence of the boundary number in a document satisfies the specified number range). While the embodiments described in detail in this document use number ranges having non-strict boundaries, it is equally easy to implement embodiments that provide an appropriate query syntax for specifying both types of number range boundaries and that generate number range Boolean expressions for both strict and non-strict boundaries.

FIG. 5 is a diagram of the number range Boolean expression tree 406 referenced in FIG. 4, in accordance with one embodiment of the present invention. Generally, for a bounded number range search, a number z will fall within the range x through y if and only if $x<=z<=y$. For the number range 721 through 727.1, the query encoder 400 generates the four level Boolean expression tree shown in FIG. 5. In some embodiments, the AND operators of the number range expressions generated by the query encoder have the special property that all the conjuncts (i.e., children of an AND operator) in the number range expression must appear at the same document position in order to satisfy that portion of the number range expression. In other words, if a number range expression tree has requirements A and B, both A and B must be satisfied by a term (typically a number) at the same position within a document. Thus, the number range expression is not satisfied by a document where A is satisfied by a term at one position, B is satisfied by a term at another position, and furthermore there is no single term in the document that satisfies both A and B.

The first level (outer most) Boolean operator is an AND operator and includes the numerical index term numrange_characteristic__2, which indicates the characteristic of a candidate indexed number in the specified range. Included under the first level AND operator are the terms numrange_digit__0__7 and numrange_digit__1__2, which correspond to initial digits (the first two digits in this example) of the boundary numbers that are the same. Therefore, a candidate number within the specified range will have a characteristic 2 and digit values 7 and 2 in digit positions 0 and 1, respectively.

Note that in the above example and in the examples that follow, 0 represents the first digit position of a candidate number.

Moving down the tree 402, a second level Boolean operator is an OR operator and includes the numerical index terms:

| | |
|---|---|
| numrange_digit_2_1, | numrange_digit_2_1_end, |
| numrange_digit_2_2, | numrange_digit_2_2_end, |
| numrange_digit_2_3, | numrange_digit_2_3_end, |
| numrange_digit_2_4, | numrange_digit_2_4_end, |
| numrange_digit_2_5, | numrange_digit_2_5_end, |
| numrange_digit_2_6, | numrange_digit_2_6_end, and |
| numrange_digit_7_end. | |

These numerical index terms represent the range of possible digit values of the third digit of a candidate number in the specified number range. For example, the numerical index term for the third digit of candidate number 722, which falls within the specified range of 721 through 727.1, is numrange_digit_2_end. Note that the use of the term "end" in a numerical index term of an expression 406 represents that there are no more digits in the candidate indexed number, other than any trailing zeros that may be needed. In some embodiments, any trailing zeros in a number (e.g., the number 200) are not encoded with index terms because they add nothing of value for purposes of number range searching. Since this numerical index term is found in the set of terms under the first level OR operator, the third digit of candidate number 722 would satisfy this part of the number range Boolean expression tree 406.

Moving further down the tree 402, a third level AND operator in the expression tree 402 includes the numerical index term numrange_digit_2_7, which represents candidate indexed numbers having digit values 7, 2, 7, located in digit positions 0, 1 and 2, respectively. The two numerical index terms included under the fourth level OR operator of FIG. 5 specify that the fourth digit (digital position 3) of a number that begins with 7, 2, 7 must take have a digit value of 0 or 1_end in order to satisfy the search query. (A digit value of 1_end indicates that the digit equals 1 and is the last digit of the number.) These possible digit values are included under the third level OR operator since the third digit value can be 0 or 1 and still fall in the specified range of 721 through 727.1. (e.g., 727.054).

Based on the above example, it is noted that any numbers that fall outside the specified number range will not satisfy the expression tree 406. Moreover, any documents containing numbers, none of which satisfy the expression tree 406, will not be presented to the user in response to the search query.

FIGS. 6 and 7 further illustrate the above concepts for a bounded range of 189-405 and an unbounded range of >=150, respectively. For simplification, the unbounded example includes a maximum characteristic of 80. This limit, however, can be adjusted as necessary to achieve a desired search resolution. The logic described for FIG. 5 is equally applicable to FIGS. 6 and 7 and therefore will not be reiterated. Note that dashed lines are used in FIGS. 6 and 7 to illustrate the tree structure of the number range Boolean expression tree corresponding to these two number ranges. In FIGS. 6 and 7, the <fieldname> represents the type of number that will satisfy the query, such as a generic number, currency or price range, or date range.

Figure 8:
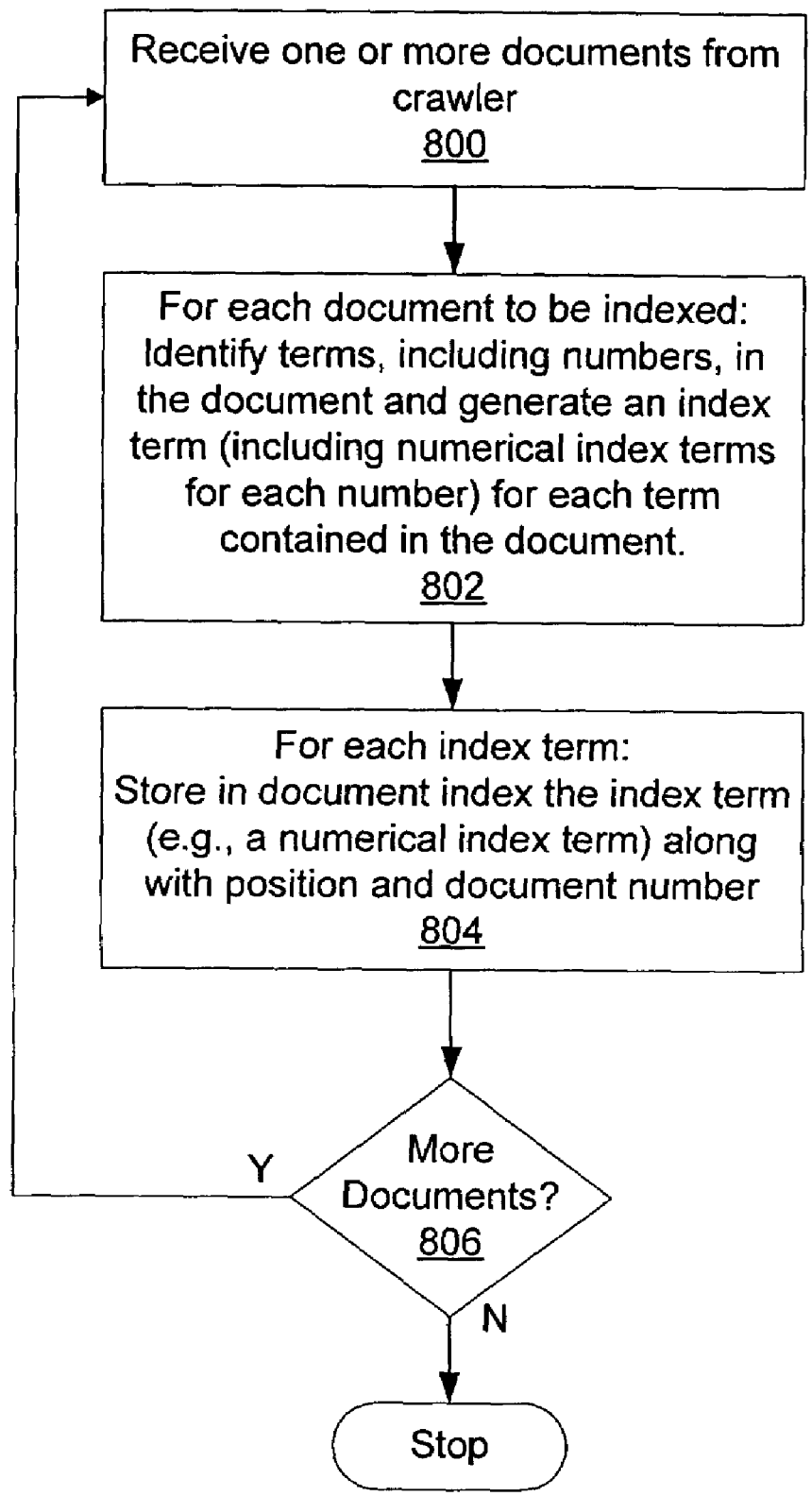
FIG. 8 is a flow diagram illustrating an indexing process, in accordance with one embodiment of the present invention.

FIG. 8 is a flow diagram illustrating an indexing process, in accordance with one embodiment of the present invention. The indexing process begins with documents being received 800 from a web crawler. The web crawler is a computer program, or a server running a computer program, that downloads documents from hosts connected to the WWW. After one or more documents are received 800 from the crawler, documents to be indexed are identified, and for each such document terms to be indexed are identified. Some downloaded documents may be excluded from the indexing process for various reasons. For example, a document may be identified as a duplicate of another document that has already been indexed. Some words, terms or symbols in a document may be excluded from indexing because of the application of various criteria. The terms to be indexed include numbers found in the documents. For each term to be indexed (from a document selected for indexing) an index term is generated 802. Step 802 includes generating an index for each number (or each non-excluded number) in the document selected for indexing. In some embodiments, some of the numbers found in a document may be terms excluded from indexing, for instance because a number is identified as being extraneous to the substantive content of the document. In other embodiments, all numbers in a document are indexed. The generation of numerical index terms was described with respect to FIGS. 2 and 3. The numerical index terms along with corresponding document numbers and positions are stored 804 in an index for use with subsequent search queries, as described with respect to FIG. 9. The process repeats (806) until all of the documents retrieved by the crawler have been processed and either the crawler delivers no additional documents that qualify for indexing or other termination criteria (e.g., expiration of a time limit) are satisfied.

Figure 9:
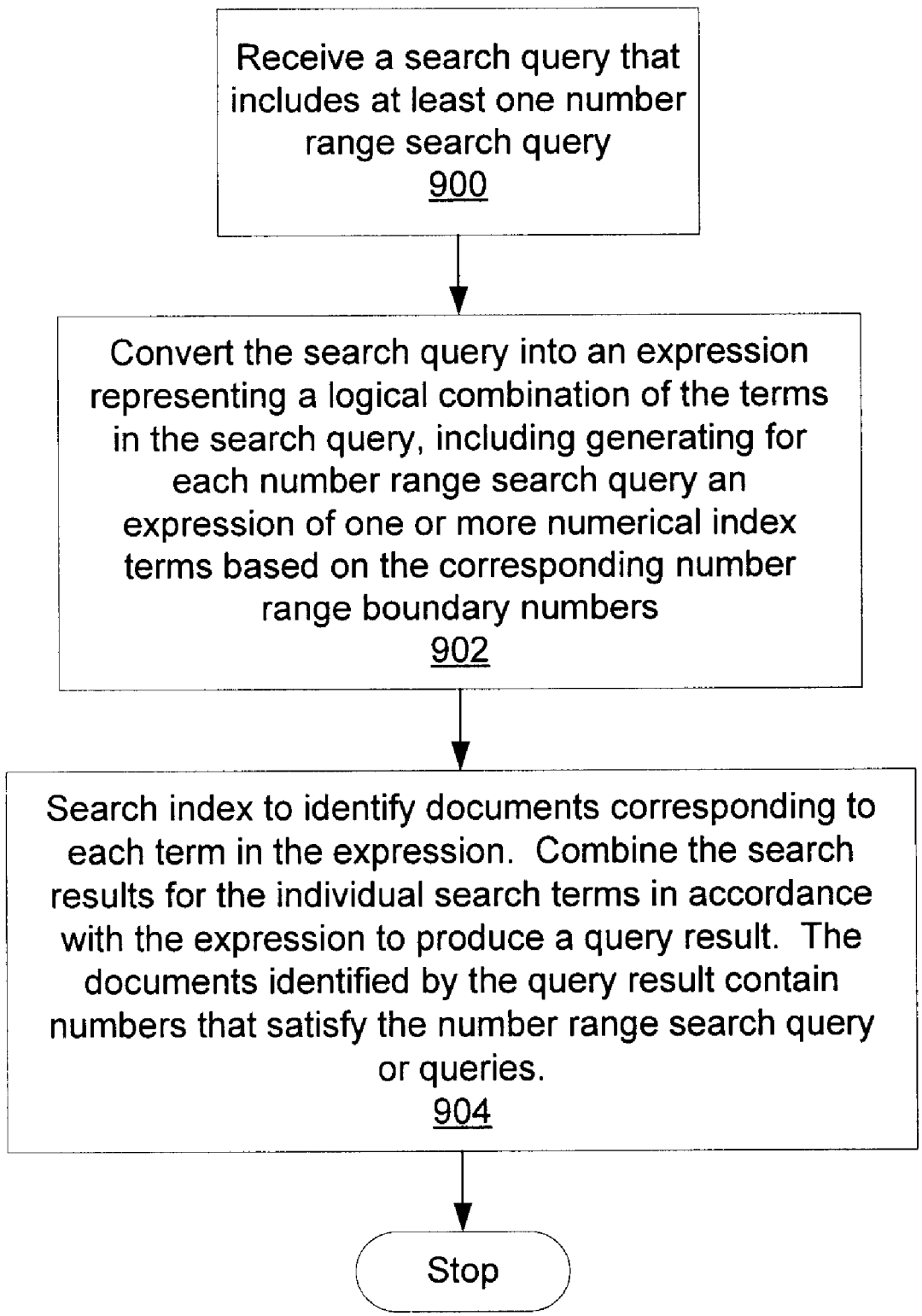
FIG. 9 is a flow diagram of a querying process, in accordance with one embodiment of the present invention.

FIG. 9 is a flow diagram of a querying process, in accordance with one embodiment of the present invention. The querying process begins with a search query that includes at least one number range search query being received 900 by a query encoder. Each number range search query embedded in the search query identifies a number range to be searched. The search query can be generated by user via a computer terminal coupled to a network, such as the Internet. The query encoder generates 902 a Boolean expression tree representing the search query. The Boolean expression tree includes an expression tree (sometimes called a subtree) representing each number range search query included within the search query. The expression tree for each number range search query contains one or more numerical index terms based on at least one number range boundary number specified by the number range search query. As noted above, when the number range specified in a query is a bounded range (e.g., 10-100) the range has two boundary numbers, and when the number range specified in a query is an unbounded range (e.g., >10) the range has one boundary number. In some embodiments, unbounded number ranges are implemented using a second boundary number that is either a predetermined large or a predetermined small number, depending on whether the upper or lower portion of the specified number range is unbounded.

The generation of Boolean expression trees is described above with respect to FIGS. 4-7. A document index server uses the expression tree generated in step 902 to identify documents corresponding to each term, including the numerical index terms as well as the non-numeric terms, in the expression tree. This produces search results for the individual search terms. The index server combines the search results for the individual search terms, in accordance with the Boolean operators in the expression tree, to produce a query result in step 904. When the Boolean expression tree produced in step 902 includes an expression subtree for a number range specified in the search query, a set of documents (if any) that satisfy the expression subtree will be identified by the query result produced by the index server 904. Thus, the documents identified in the query result contain numbers that satisfy the number range search query or queries included within the search query.

In some embodiments, the search query is conveyed to the document index servers 120 (FIG. 1). Each index server encodes the query so as to produce the corresponding expression tree, searches one or more partitions or sub-partitions of the document index for documents that correspond to the terms in the expression tree, and combines those results in accordance with the expression tree to produce a set of search results. Those search results are then conveyed to the second level controller 118. Thus, in these embodiments, multiple index servers 120 generate the same expression tree. In other embodiments, the expression tree for a query is generated higher up in the chain of servers shown in FIG. 1, such as in the second level controller 118, or the controller 114, and the resulting expression tree is then conveyed to the index servers 120 as a representation of the search query. In some instances, the expression tree can be quite large, having hundreds of nodes. It is for this reason that in some embodiments the expression tree is generated by each of the index servers instead of being generated elsewhere and then conveyed to the index servers 120.

Expression Tree Generation

In some embodiments, the tree generation process begins in the querying phase by restricting prefixes (defined below) of numbers. For purposes of this discussion, the following definitions shall hold. (1) "x" is a boundary number that represents the low end of the number range to be searched and has a set of terms under which it would be indexed. These terms are referred to as term $x_0$ (the characteristic) through term $x_n$ (the last digit to be indexed). (2) "y" is a boundary number that represents the high end of the range to be searched and has a set of terms under which it would be indexed. These terms are referred to as term $y_0$ (the characteristic) through term $y_n$ (the last digit to be indexed). (3) A "prefix" of x is a set of terms (term $x_0$, . . . , term $x_i$), where i<=n. (4) "d" is the first digit where boundary numbers x and y disagree (i.e., just past the longest common prefix). (5) In some embodiments, the index terms for a number are compared with the corresponding terms of a boundary number using the technique of defining a "partial order." In particular, a term of the form numrange_digit_j_k is considered to be "less than" numrange_digit_m_n provided that j=m and either k<n or k=n and the numrange_digit_j_k term has the "end marker". In the latter case, numrange_digit_j_k is also considered to be "greater than" numrange_digit_m_n.

Thus, in the previous example, the terms numrange_characteristic_2, numrange_0_7 and numrange_1_2 represent a prefix.

In one embodiment, there are four groups of nodes (Groups 1-4) created during querying operations. For Group 1, one leaf node is created for each numerical index term in the longest prefix common to each boundary number of the range. These numerical index terms are included under an AND operator, as shown in FIG. 5.

Group 2 nodes consist of the numerical index terms strictly between terms $x_d$ and $y_d$, if there are any. For example, if x has terms numrange_characteristic_2, numrange_digit_0_1, numrange_digit_1_6, and some other terms, and y has terms numrange_characteristic_2, numrange_digit_0_1, numrange_digit_1_9, and some other terms, then the common prefix is the first two terms, and d=2. Then numrange_digit_1_7,
numrange_digit_1_7_end,
numrange_digit_1_8,
numrange_digit_1_8_end, and
numrange_digit_1_9_end are strictly between terms $x_d$ and $y_d$. These terms are included under an OR-operator.

Group 3 addresses terms representing "greater or equal to x after term d". This is done by defining a function greater(i), where i represents a term number and will range from term $x_{d+1}$ to term $x_n$. The function greater(i) defines an OR-node containing all terms (if any) strictly greater than term $x_i$. This OR node also contains an AND-node with term $x_i$ and the expression tree generated by the function greater(term $x_{i+1}$), recursively defined. For example, if term $x_{d+1}$ is numrange_digit_2_7, then greater(term $x_{d+1}$) is the tree:

OR
   |---numrange_digit_2_8
   |---numrange_digit_2_9
   |---AND
   |---numrange_digit_2_7
   |---{tree generated from greater($x_{d+2}$)}

This recursion finishes at greater ($x_{n+1}$), where the tree is empty. To construct a "strict inequality range" that does not include the lower boundary number, the last term output (term $x_n$) is discarded.

Group 4 is the "mirror image" of Group 3, with index terms representing "less than or equal to y after term d". This is done by defining a function less(i), where i represents a term number and will range from $y_{d+1}$ to $y_n$. The function less($y_i$) defines an OR-node containing all terms (if any) strictly less than term $y_i$. This OR-node also contains an AND-node with term $y_i$ and the tree generated by the function less(term $y_{i+1}$), recursively defined. For example, if term $y_{d+1}$ is numrange_digit_2_4, then greater($y_{d+1}$) is the tree:

OR
   |---numrange_digit_2_0
   |---numrange_digit_2_1
   |---numrange_digit_2_2
   |---numrange_digit_2_3
   |---AND
   |---numrange_digit_2_4
   |---{tree generated from less($y_{d+2}$)}

This recursion finishes at greater($y_n$+1), where the tree is empty. To construct a "strict inequality range" that does not include the upper boundary number, the last term output (term $y_n$) is discarded.

After these groups are defined, they are assembled together as follows:

AND
   |---{Group 1}
   |---OR
   |---{Group 2}
   |---AND
      |---{term xd}
      |---{Group 3}
      |---AND
         |---{term yd}
         |---{Group 4}

To simplify this tree, any empty OR-nodes or AND-nodes can be deleted from the tree. Alternately, if an OR-node or AND-node has just one child node, then the child node can take the place of its parent in the expression tree (i.e., the OR or AND-node is deleted and replaced by the child node). In some embodiments, these tree simplifying steps are repeated until all AND-nodes and OR-nodes in the expression tree have at least two child nodes.

If the specified number range includes or spans the number 0, then the range can be broken up into three pieces under an OR-node: 1) the subrange greater than 0, which is created with a tree as described above; 2) terms less than 0 (e.g., the range –5-0), which is performed by applying the same technique to the negative of the expression, namely the range 0-5, except that all terms have the negative marker in them; and 3) if zero is in the range, a leaf node is created for zero (e.g., with a term of "numrange_zero"), which has to be specially indexed since it has no characteristic. As described above, in some embodiments when a number in a document is exactly equal to zero, it is indexed by the document indexer 108 (FIG. 2) using a term having a special number range type, such as "numrange_zero".

Figure 10:
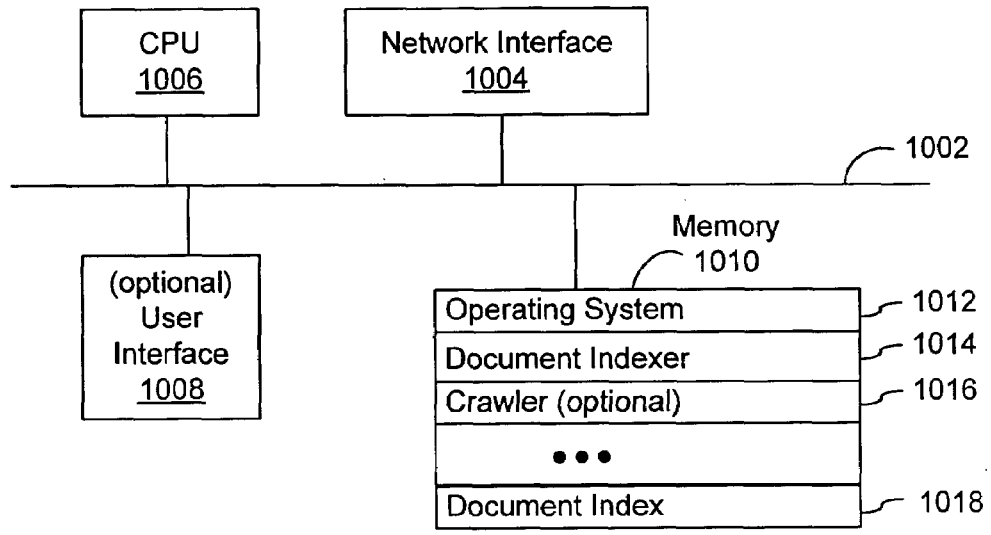
FIG. 10 is a block diagram of an indexing system, in accordance with one embodiment of the present invention.

FIG. 10 is a block diagram of an indexing system 1000, in accordance with one embodiment of the present invention. The indexing system 1000 may be used as one of the document indexers 108 in the search engine system shown in FIG. 1. The indexing system 1000 generally includes a network interface 1004, one or more central processing units (CPUs) 1006, an optional user interface 1008 and memory 1010, all of which are interconnected by one or more buses 1002. The memory 1010 can be any computer-readable medium for storing computer programs containing instructions which can be executed by the CPU 1006 to perform the various functions of the indexing system 1000. The memory 1010 preferably includes high-speed random access memory and may include non-volatile memory, such as one or more magnetic disk storage devices. Memory 1010 may also include storage that is remotely located from the rest of the indexing system 1000.

The memory includes an operating system 1012, a document indexer 1014, and a document index 1018. The operating system 1012 controls the various operations of the indexing system 1000 (e.g., reading and writing to memory, providing software drivers for the user interface and network interface, etc.). The document indexer 1014 generates index terms for the documents, which are stored in the document index 1018. Among the index terms that are stored in the index 1018 are numerical index terms, the generation of which was described with respect to FIGS. 2, 3 and 8. The optional user interface 1008 can be used by a system administrator to control and maintain the indexing system 1000.

In some embodiments the memory 1010 of the indexing system 1000 may include a crawler 1016. The crawler 1016 is a procedure or set of procedures that searches and downloads identified documents, such as a list of documents in a queue, from various data sources, such as the WWW, newsgroups and the like, and provides those documents to the document indexer 1014. In some embodiments the crawler 1016 may also identify additional documents to download based on links contained in the downloaded documents. In other embodiments, the task of identifying additional documents to download is performed by other servers in the search engine system. In some embodiments the crawler 1016 is implemented using a separate system from the indexing system, as shown in FIG. 1.

Figure 11:
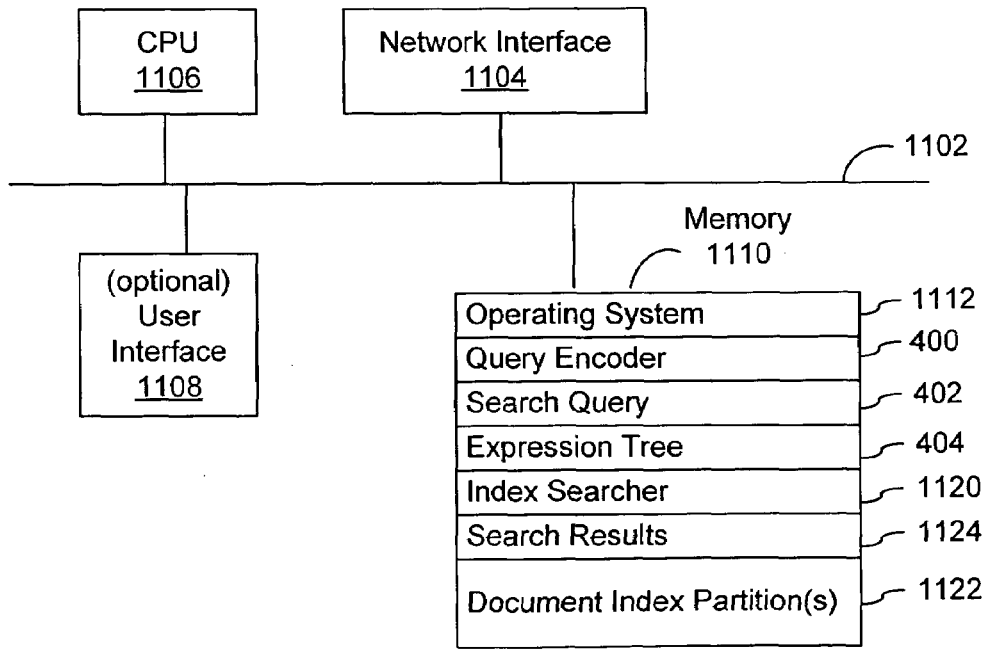
FIG. 11 is a block diagram of a query encoding system, in accordance with one embodiment of the present invention.

FIG. 11 is a block diagram of a query encoding system 1100, in accordance with one embodiment of the present invention. The query encoding system 1100 includes a network interface 1104, one or more central processing units (CPUs) 1106, an optional user interface 1108 and memory 1110, all of which are interconnected by one or more buses 1102. The memory 1110 can be any computer-readable medium for storing computer programs containing instructions which can be executed by the CPU 1106 to perform the various functions of the query encoding system 1100. The memory 1110 preferably includes high-speed random access memory and may include non-volatile memory, such as one or more magnetic disk storage devices. Memory 1110 may also include storage that is remotely located from the rest of the indexing system 1000.

The memory 1110 includes an operating system 1112 and a query encoder 400. The operating system controls the various operations of the query encoding system 1100. The query encoder 400 encodes or converts a search query 402 into an expression tree 404 to facilitate a search of the document index 1018. Among the search queries that are encoded by the query encoder 1114 are number range search queries, which search queries are encoded as described with respect to FIGS. 4-7 and 9. The optional user interface 1108 can be used by a system administrator to control and maintain the query encoding system 1100.

In some embodiments the query encoding system 1110 is a document index server (120, FIG. 1), in which case the memory 1110 also includes an index searcher 1120 and one or more document index partitions or sub-partitions 1122. The memory 1110 also temporarily stores search results 1124 to be returned to controller 118 (FIG. 1).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described to best explain the principles of the invention and its practical applications, to thereby enable others skilled in the art to best utilize the invention and various embodiments with various modifications as are suited to the particular use contemplated.

What is claimed is:

1. A computer-implemented method of querying number-range searches, comprising:
    at a search engine having one or more processors and memory, the memory of the search engine storing one or more programs to be executed by the one or more processors of the search engine,
        receiving a number-range search query having a number range, wherein the number range includes a boundary number;
        generating an expression of numerical index terms based on the boundary number, wherein a respective numerical index term in the expression includes information indicative of an integral portion of a logarithm of the boundary number;
        searching a document index of the search engine using the expression to identify one or more documents containing numbers that satisfy the expression; and
        returning a result in accordance with at least a subset of the identified documents.

2. The method of claim 1, wherein at least one numerical index term in the expression includes information indicating that a specified digit is a last non-zero digit of a respective number.

3. The method of claim 1, wherein at least one numerical index term in the expression includes information indicative of a sign of a respective number.

4. The method of claim 1, wherein at least one numerical index term in the expression includes information indicative of a number type associated with a respective number range.

5. The method of claim 1, wherein the expression includes a plurality of numerical index terms that each correspond to a single respective digit of a respective number.

6. The method of claim 5, wherein a respective numerical index term in the expression represents a respective digit of a respective number in base 10.

7. The method of claim 6, wherein the respective numerical index term in the expression corresponds to the position of the respective digit within the respective number.

8. The method of claim 1, wherein the integral portion of the logarithm of a respective boundary number is an integral portion of a base 10 logarithm of the respective boundary number.

9. The method of claim 1, wherein a respective numerical index term in the expression includes information indicative of a mantissa of a respective number.

10. A computer-readable medium having stored thereon instructions which, when executed by a processor, cause the processor to perform the operations of:

receiving a number-range search query having a number range, wherein the number range includes a boundary number;

generating an expression of numerical index terms based on the boundary number, wherein a respective numerical index term in the expression includes information indicative of an integral portion of a logarithm of the boundary number;

searching a document index using the expression to identify one or more documents containing numbers that satisfy the expression; and returning a result in accordance with at least a subset of the identified documents.

11. The computer-readable medium of claim 10, wherein at least one numerical index term in the expression includes information indicating that a specified digit is a last non-zero digit of a respective number.

12. The computer-readable medium of claim 10, wherein at least one numerical index term in the expression includes information indicative of a sign of a respective number.

13. The computer-readable medium of claim 10, wherein at least one numerical index term in the expression includes information indicative of a number type associated with a respective number range.

14. The computer-readable medium of claim 10, wherein the expression includes a plurality of numerical index terms that each correspond to a single respective digit of a respective number.

15. The computer-readable medium of claim 14, wherein a respective numerical index term in the expression represents a respective digit of a respective number in base 10.

16. The computer-readable medium of claim 15, wherein the respective numerical index term in the expression corresponds to a position of the respective digit within the respective number.

17. The computer-readable medium of claim 10, wherein the integral portion of the logarithm of a respective boundary number is an integral portion of a base 10 logarithm of the respective boundary number.

18. The computer-readable medium of claim 10, wherein a respective numerical index term in the expression includes information indicative of a mantissa of a respective number.

19. A search engine for querying number range searches, comprising:

one or more servers, each having one or more processors and memory, the memory of the one or more servers storing one or more programs to be executed by the one or more processors of the one or more servers, the one or more programs including:

a query encoder configured to receive a search query for a number range having a boundary number, wherein the query encoder is configured to generate an expression of numerical index terms based on the boundary number, and wherein a respective numerical index term in the expression includes information indicative of an integral portion of a logarithm of the boundary number; and an index searcher coupled to the query encoder and configured to search a document index using the expression to identify one or more documents containing numbers that satisfy the expression and to return a result in accordance with at least a subset of the identified documents.

20. The search engine of claim 19, wherein at least one numerical index term in the expression includes information indicating that a specified digit is a last non-zero digit of a respective number.

21. The search engine of claim 19, wherein at least one numerical index term in the expression includes information indicative of a sign of a respective number.

22. The search engine of claim 19, wherein at least one numerical index term in the expression includes information indicative of a number type associated with a respective number range.

23. The search engine of claim 19, wherein the expression includes a plurality of numerical index terms that each correspond to a single respective digit of a respective number.

24. The search engine of claim 23, wherein a respective numerical index term in the expression represents a respective digit of a respective number in base 10.

25. The search engine of claim 24, wherein the respective numerical index term in the expression corresponds to a position of the respective digit within the respective number.

26. The search engine of claim 19, wherein the integral portion of the logarithm of a respective boundary number is an integral portion of a base 10 logarithm of the respective boundary number.

27. The search engine of claim 19, wherein a respective numerical index term in the expression includes information indicative of a mantissa of a respective number.

* * * * *